United States Patent
Sachdeva et al.

(10) Patent No.: US 12,367,725 B2
(45) Date of Patent: Jul. 22, 2025

(54) TRAJECTORY AND INTENT PREDICTION

(71) Applicant: ASSA ABLOY AB, Stockholm (SE)

(72) Inventors: Kapil Sachdeva, Round Rock, TX (US); Sylvain Jacques Prevost, Austin, TX (US); Jianbo Chen, Cedar Park, TX (US)

(73) Assignee: ASSA ABLOY AB, Stockholm (SE)

( * ) Notice: Subject to any disclaimer, the term of this patent is extended or adjusted under 35 U.S.C. 154(b) by 169 days.

(21) Appl. No.: 18/257,182

(22) PCT Filed: Dec. 7, 2021

(86) PCT No.: PCT/EP2021/084586
§ 371 (c)(1),
(2) Date: Jun. 13, 2023

(87) PCT Pub. No.: WO2022/128623
PCT Pub. Date: Jun. 23, 2022

(65) Prior Publication Data
US 2024/0096155 A1    Mar. 21, 2024

Related U.S. Application Data

(60) Provisional application No. 63/125,044, filed on Dec. 14, 2020.

(51) Int. Cl.
*G07C 9/28*    (2020.01)
*G06N 20/00*    (2019.01)
(Continued)

(52) U.S. Cl.
CPC ............... *G07C 9/28* (2020.01); *G06N 20/00* (2019.01); *G07C 9/00309* (2013.01); *G07C 9/22* (2020.01);
(Continued)

(58) Field of Classification Search
CPC ........ G07C 9/28; G07C 9/00309; G07C 9/22; G07C 2009/00793; G07C 2209/63;
(Continued)

(56) References Cited

U.S. PATENT DOCUMENTS 7,499,674 B2    3/2009   Salokannel et al.
7,597,250 B2    10/2009  Finn
(Continued)

FOREIGN PATENT DOCUMENTS

CN    202703516    1/2013
EP    2617242    10/2016
(Continued)

OTHER PUBLICATIONS

"International Application Serial No. PCT EP2021 084586, International Search Report mailed Apr. 7, 2022", 5 pgs.
(Continued)

*Primary Examiner* — Nam V Nguyen
(74) *Attorney, Agent, or Firm* — Schwegman Lundberg & Woessner, P.A.

(57) ABSTRACT

Methods and systems for trajectory and intent prediction are provided. The methods and systems include operations comprising: receiving an observed trajectory of a user and user behavior information; processing the observed trajectory by a machine learning technique to generate a plurality of predicted trajectories, the machine learning technique being trained to establish a relationship between a plurality of training observed trajectories and training predicted trajectories; adjusting the plurality of predicted trajectories based on the user behavior information to determine user intent to operate a target access control device; determining that the target access control device within a threshold range of a given one of the plurality of predicted trajectories; and in response to determining that the target access control
(Continued)

device is within the threshold range of the given one of the plurality of predicted trajectories, performing an operation associated with the target access control device.

20 Claims, 9 Drawing Sheets

(51) Int. Cl.
  *G07C 9/00* (2020.01)
  *G07C 9/22* (2020.01)
(52) U.S. Cl.
  CPC .............. *G07C 2009/00793* (2013.01); *G07C 2209/63* (2013.01)
(58) Field of Classification Search
  CPC ........ G07C 9/00; G07C 9/00857; G07C 9/27; G07C 2009/00753; G06N 20/00; H04L 63/107; H04W 12/63; G05B 13/04
  USPC ........................................................ 340/5.61
  See application file for complete search history.

(56) References Cited

U.S. PATENT DOCUMENTS

| | | | |
|---|---|---|---|
| 7,756,002 | B2 | 7/2010 | Batra et al. |
| 7,881,746 | B2 | 2/2011 | Desai |
| 7,995,644 | B2 | 8/2011 | Sahinoglu et al. |
| 8,355,671 | B2 | 1/2013 | Kramer et al. |
| 8,478,360 | B2 | 7/2013 | Soliman |
| 8,736,438 | B1 | 5/2014 | Vasquez et al. |
| 8,913,599 | B2 | 12/2014 | Gonikberg et al. |
| 9,408,147 | B2 | 8/2016 | Polo et al. |
| 9,424,468 | B2 * | 8/2016 | Shimizu ................. G06V 40/10 |
| 9,530,265 | B2 | 12/2016 | Lee et al. |
| 9,666,005 | B2 | 5/2017 | Ellis et al. |
| 9,721,404 | B2 | 8/2017 | Muller |
| 9,769,627 | B2 | 9/2017 | Siswick et al. |
| 9,942,849 | B1 | 4/2018 | Hariharan et al. |
| 10,117,046 | B2 | 10/2018 | Ledvina et al. |
| 10,171,129 | B1 | 1/2019 | Hammerschmidt et al. |
| 10,356,553 | B2 | 7/2019 | Sant et al. |
| 10,486,646 | B2 | 11/2019 | Ledvina et al. |
| 10,567,034 | B2 | 2/2020 | Hammerschmidt et al. |
| 10,602,556 | B2 | 3/2020 | Foster et al. |
| 10,652,925 | B2 | 5/2020 | Naguib et al. |
| 10,660,037 | B2 | 5/2020 | Hariharan et al. |
| 10,759,389 | B2 | 9/2020 | Ledvina et al. |
| 10,819,029 | B2 | 10/2020 | Amiri et al. |
| 11,016,491 | B1 * | 5/2021 | Millard ................... G06N 3/045 |
| 11,076,289 | B1 * | 7/2021 | Dashputra ............. H04W 12/06 |
| 11,188,038 | B2 * | 11/2021 | Horgan ................ G05B 13/048 |
| 11,405,784 | B2 * | 8/2022 | Pirch ........................ G06N 3/08 |
| 11,474,485 | B2 * | 10/2022 | Lee ....................... G05B 13/048 |
| 11,568,690 | B2 | 1/2023 | Einberg |
| 2003/0232620 | A1 | 12/2003 | Runkle et al. |
| 2014/0355582 | A1 | 12/2014 | Kamath et al. |
| 2015/0310681 | A1 | 10/2015 | Avery et al. |
| 2015/0332532 | A1 | 11/2015 | Lee et al. |
| 2016/0234008 | A1 | 8/2016 | Hekstra et al. |
| 2016/0241999 | A1 | 8/2016 | Chin et al. |
| 2016/0278006 | A1 | 9/2016 | Lee et al. |
| 2016/0316500 | A1 | 10/2016 | Aliyar |
| 2016/0353233 | A1 | 12/2016 | Yong et al. |
| 2016/0360341 | A1 | 12/2016 | Srivatsa et al. |
| 2017/0070919 | A1 | 3/2017 | Verger et al. |
| 2017/0151918 | A1 | 6/2017 | Boesen |
| 2017/0153636 | A1 | 6/2017 | Boesen |
| 2017/0158202 | A1 | 6/2017 | Yang |
| 2017/0232930 | A1 | 8/2017 | Murar et al. |
| 2017/0236346 | A1 | 8/2017 | Murar et al. |
| 2019/0097317 | A1 | 3/2019 | Di Nallo et al. |
| 2019/0098499 | A1 | 3/2019 | Lerch et al. |
| 2019/0116619 | A1 | 4/2019 | Hauck et al. |
| 2019/0354073 | A1 | 11/2019 | Horgan et al. |
| 2020/0053689 | A1 | 2/2020 | Mcqueen et al. |
| 2020/0150261 | A1 | 5/2020 | Naguib et al. |
| 2020/0259522 | A1 | 8/2020 | Hammerschmidt et al. |
| 2020/0320188 | A1 | 10/2020 | Graff et al. |
| 2020/0349785 | A1 * | 11/2020 | Kuenzi ............. H04M 1/72412 |
| 2020/0351781 | A1 | 11/2020 | Hariharan et al. |
| 2021/0295293 | A1 * | 9/2021 | Delson ................... H04L 45/12 |
| 2022/0164422 | A1 * | 5/2022 | Gelardi ................. G06F 21/316 |

FOREIGN PATENT DOCUMENTS

| | | |
|---|---|---|
| EP | 3101874 | 12/2016 |
| IN | 202317045044 | 1/2023 |
| JP | 6205237 | 9/2017 |
| JP | 2024509344 | 3/2024 |
| KR | 101077406 | 10/2011 |
| KR | 20170040240 | 4/2017 |
| WO | 2013178163 | 12/2013 |
| WO | 2016007627 | 1/2016 |
| WO | 2016059451 | 4/2016 |
| WO | 2017136725 | 8/2017 |
| WO | 2017144345 | 8/2017 |
| WO | 2020083750 | 4/2020 |
| WO | 2020193576 | 10/2020 |
| WO | 2022128623 | 6/2022 |

OTHER PUBLICATIONS

"International Application Serial No. PCT EP2021 084586, Written Opinion mailed Apr. 7, 2022", 12 pgs.

Mangalam, Karttikeya, "It Is Not the Journey but the Destination: Endpoint Conditioned Trajectory Prediction", arxiv.org, Cornell University Library, 201 Olin Library Cornell University Ithaca, NY 14853, (Apr. 4, 2020), 18 pgs.

Xue, Hao, "A Location-Velocity-Temporal Attention LSTM Model for Pedestrian Trajectory Prediction", IEEE Access, IEEE, USA, vol. 8, [retrieved on Mar. 10, 2020], (Feb. 29, 2020), 44576-44589.

"European Application Serial No. 21836380.2, Response to Communication Pursuant to Rules 161 and 162 EPC Filed Jan. 18, 2024", 14 pages.

"International Application Serial No. PCT EP2021 084586, International Preliminary Report on Patentability mailed Jun. 29, 2023", 14 pages.

"Korean Application Serial No. 10-2023-7023695, Voluntary Amendment filed Nov. 14, 2024", W English Claims, 18 pgs.

* cited by examiner

TRAJECTORY AND INTENT PREDICTION

PRIORITY APPLICATION

This application is a U.S. National Stage filing under 35 U.S.C. § 371 of PCT Patent Application No. PCT/EP2021/084586, filed on Dec. 7, 2021, which claims priority to U.S. Provisional Patent Application Ser. No. 63/125,044, filed Dec. 14, 2020, the disclosure of which are incorporated herein in their entirety by reference.

BACKGROUND

Trajectory prediction plays an important role in many tasks such as intelligent access control systems. It is generally defined as predicting positions of a movable agent (e.g., person, vehicle or mobile device) at each time step within a predefined future time interval, based on observed partial trajectories over a certain period.

SUMMARY

In some aspects, a method is provided comprising: receiving, by one or more processors, an observed trajectory of a user and user behavior information for the user; processing the observed trajectory by a machine learning technique to generate a plurality of predicted trajectories, the machine learning technique being trained to establish a relationship between a plurality of training observed trajectories and training predicted trajectories; adjusting the plurality of predicted trajectories based on the user behavior information to determine user intent to operate a target access control device; determining that the target access control device within a threshold range of a given one of the plurality of predicted trajectories; and in response to determining that the target access control device is within the threshold range of the given one of the plurality of predicted trajectories, performing an operation associated with the target access control device.

In some aspects, the target access control device comprises a lock associated with a door, and the performing the operation comprises unlocking the door.

In some aspects, the method includes establishing a wireless communication link between a mobile device of a user and the target access control device; exchanging authorization information over the wireless communication link; and performing the operation after determining that the user is authorized, based on the authorization information, to access the target access control device.

In some aspects, the method includes determining that the user is authorized, based on the authorization information, to access the target access control device prior to performing the operation; and delaying performing the operation after determining that the user is authorized until the target access control device is determined to be within the threshold range of the given one of the plurality of predicted trajectories.

In some aspects, the method includes determining that the user is authorized, based on the authorization information, to access the target access control device prior to performing the operation; and preventing performing the operation after determining that the user is authorized in response to determining that the target access control device is outside of the threshold range of the given one of the plurality of predicted trajectories.

In some aspects, the machine learning technique comprises a conditioned variational autoencoder.

In some aspects, adjusting the plurality of predicted trajectories based on the user behavior information comprises processing the observed trajectory and the user behavior information by the conditioned variational autoencoder to generate the plurality of predicted trajectories, each of the plurality of predicted trajectories is associated with a respective probability indicating a likelihood that the user will travel along the corresponding predicted trajectory.

In some aspects, the machine learning technique comprises a variational autoencoder.

In some aspects, adjusting the plurality of predicted trajectories based on the user behavior information comprise concatenating the user behavior information with the plurality of predicted trajectories output by the variational autoencoder, each of the plurality of predicted trajectories is associated with a respective probability indicating a likelihood that the user will travel along the corresponding predicted trajectory.

In some aspects, the method includes processing the concatenated user behavior information and the plurality of predicted trajectories with a second machine learning technique, the second machine learning technique being trained to establish a relationship between a plurality of training user behavior information and predicted intentions of operating access control devices.

In some aspects, the method includes encoding the observed trajectory of the user, wherein the machine learning technique is applied to the encoded observed trajectory of the user.

In some aspects, the method includes determining whether the received user behavior information satisfies a minimum parameter of user behavior information.

In some aspects, the method includes in response to determining that the received user behavior information satisfies the minimum parameter of user behavior information, allowing the target access control device to perform the operation.

In some aspects, the method includes in response to determining that the received user behavior information fails to satisfy the minimum parameter of user behavior information, preventing the target access control device from performing the operation.

In some aspects, the minimum parameter comprises a threshold quantity of specified types of user behavior information.

In some aspects, the method includes generating the user behavior information by encoding a feature vector that includes at least one of: monitoring physical movement of the user; monitoring a stride of the user; identifying times and locations at which the user operates different types of access control devices; identifying other client devices and other types of access control devices within range of the user when a given access control device is being operated by the user; or identifying other users who are typically in his/her social network.

In some aspects, the machine learning technique comprises a first machine learning technique, further comprising: generating the user behavior information by a second machine learning technique, the second machine learning technique being trained to establish a relationship between training user behavior information and predicted user behavior information; and generating the user intent to operate the target access control device by a third machine learning technique, the third machine learning technique being trained to establish a relationship between training user behavior information concatenated with a set of trajectories and predicted user intent to operate access control devices.

In some aspects, each of the first, second and third machine learning techniques are trained end-to-end.

In some aspects, a system is provided comprising: one or more processors coupled to a memory comprising non-transitory computer instructions that when executed by the one or more processors perform operations comprising: receiving an observed trajectory of a user and user behavior information for the user; processing the observed trajectory by a machine learning technique to generate a plurality of predicted trajectories, the machine learning technique being trained to establish a relationship between a plurality of training observed trajectories and training predicted trajectories; adjusting the plurality of predicted trajectories based on the user behavior information to determine user intent to operate a target access control device; determining that the target access control device within a threshold range of a given one of the plurality of predicted trajectories; and in response to determining that the target access control device is within the threshold range of the given one of the plurality of predicted trajectories, performing an operation associated with the target access control device.

In some aspects, a non-transitory computer readable medium is provided comprising non-transitory computer-readable instructions for performing operations comprising: receiving an observed trajectory of a user and user behavior information for the user; processing the observed trajectory by a machine learning technique to generate a plurality of predicted trajectories, the machine learning technique being trained to establish a relationship between a plurality of training observed trajectories and training predicted trajectories; adjusting the plurality of predicted trajectories based on the user behavior information to determine user intent to operate a target access control device; determining that the target access control device within a threshold range of a given one of the plurality of predicted trajectories; and in response to determining that the target access control device is within the threshold range of the given one of the plurality of predicted trajectories, performing an operation associated with the target access control device.

DETAILED DESCRIPTION

Figure 1:
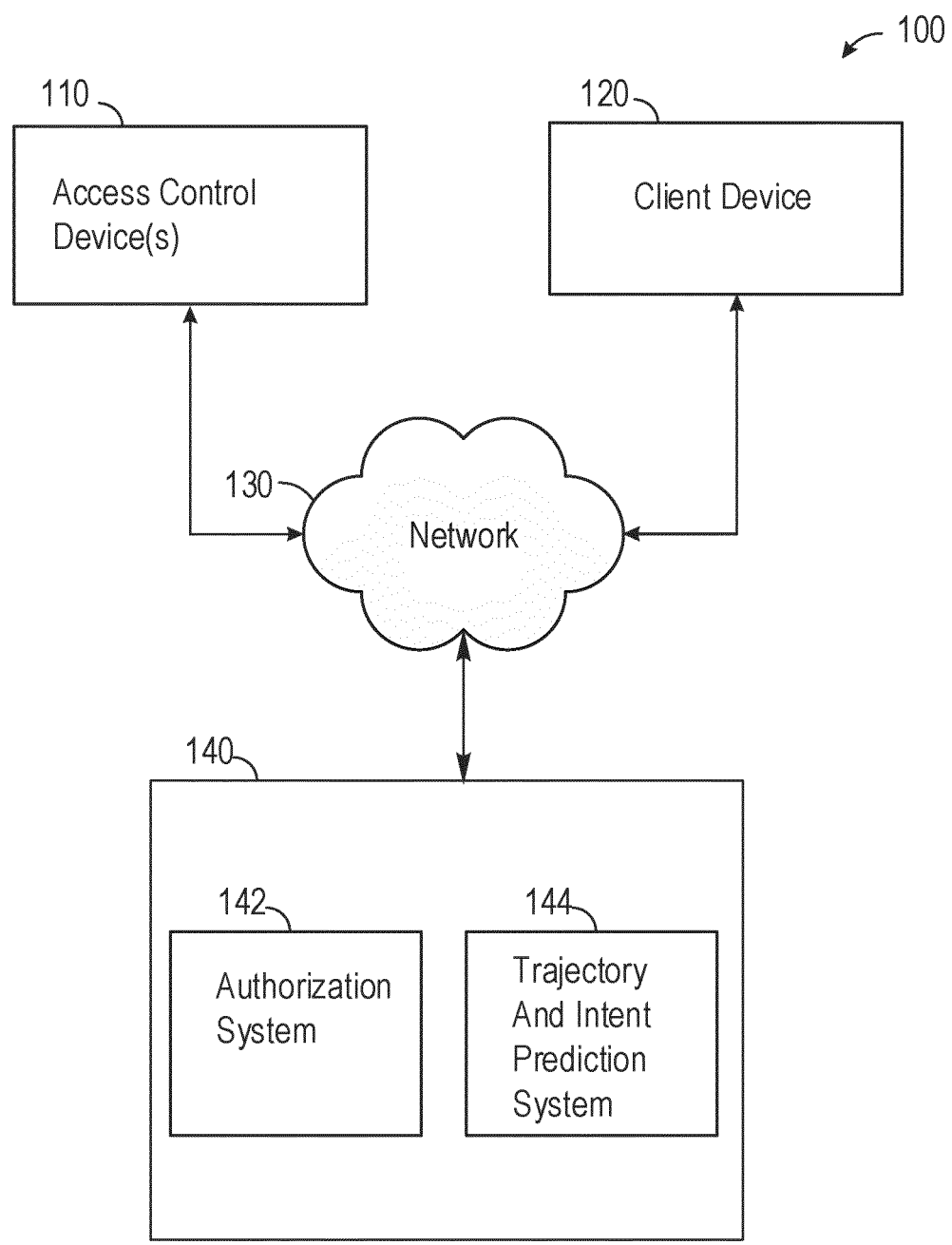
FIG. 1 is a block diagram of an example access control system, according to some embodiments.

Example methods and systems for an access control system (e.g., physical or logical access control system) based on trajectory and intent prediction are described. In the following description, for purposes of explanation, numerous specific details are set forth in order to provide a thorough understanding of example embodiments. It will be evident, however, to one of ordinary skill in the art that embodiments of the invention may be practiced without these specific details.

In typical access control systems, a user carries a physical card or device that contains a set of credentials (e.g., authorization information). Such credentials are exchanged with an access device (e.g., an electronic door lock) when the physical card or device is brought within about 20 centimeters (close proximity) to the access device. At that point, the access device determines if the credentials authorize the user to access the access device and, if so, the access device grants access (e.g., opens the door lock). While such systems generally work well, they require the user to be very close to the access device to operate the access device. This can introduce various latencies in operating the devices and can be frustrating to users.

As mobile devices become more common place, such mobile devices can be programmed to carry the same set of credentials as the physical cards that are typically used. These mobile devices can communicate with access devices over longer distances, such as using a Bluetooth Low Energy (BLE) communication protocol. For example, the mobile devices can transmit and exchange the credentials with an access device over a range of up to 100 meters. In such cases, the access device can be operated when the user is at a greater distance away from the access device than with the use of the physical card or device. This way, when the user finally reaches the access device, the access device has already received and authorized the credentials and has granted or denied access to the user. No further action is needed from the user to operate the device when the user reaches the device (e.g., the user need not bring the physical card in close proximity to the access device).

These other approaches of exchanging credentials over BLE, though, introduce another problem. Namely, if there exist multiple access devices within range of the BLE communication protocol, the credentials may be exchanged with a device that the user does not intend to operate. For example, there may exist multiple electronic door locks in range of the user's mobile device to which the user has credentials to access. However, the user may only intend to unlock or operate one of the multiple electronic door locks. As another example, the user may pass by a given door or access control device that the user is authorized to access but may not intend to pass through or operate the given door or access control device. In such cases, determining the trajectory of the user can play an important role to determining which of the multiple correct access devices to operate and the user's intentions as to operating such devices.

Typical trajectory prediction systems receive a few steps of observed trajectories as input and generate several numbers of consecutive locations into the future timeline. These typical trajectory prediction systems can provide a set of trajectories that are predicted to be within the user's travel path. Most of the traditional and modern methods of future trajectory prediction aim to build one model that is supposed to address the prediction for many users. Such approaches are severely limited because the human motion is inherently unique and dynamic. Also, the manner in which one user holds the phone device can be very different from the manner another user holds the phone. For example, some users prefer to hold the mobile device in their hand. This means that two-dimensional (2D) or three-dimensional (3D) location coordinates are extremely noisy because as they walk, they swing their arm and thereby displace the mobile device forward and backward. Other users may have the phones in the front or back pockets. Also, based on the height of the user or his/her general preference for walk they would have differences in the stride. As such, while typical trajectory prediction systems that rely on user's location generally work well to predict multiple future trajectories, they typically do not take into account the user specificities and therefore lack in accuracy requirements that prevents them from being applied accurately in the case of credential exchange and control of access devices.

The disclosed embodiments provide an intelligent solution which can precisely forecast the future positions of the user and determine the intent of the user so the access control system can provide a proactive and seamless experience for users while maintaining high security. The disclosed embodiments provide a trajectory prediction system that predicts a trajectory of a user based also on past and present user behavior information. Based on the predicted trajectory or a given set of predicted trajectories and the user behavior information, if a given access device is within range of the trajectory and is authorized for access by a user (as determined by a long range exchange of credentials, such as over BLE), the given access device is operated. As an example, the given access device (e.g., a door lock) can initially communicate with a mobile device of a user over one communication protocol (e.g., BLE) to exchange authorization data (e.g., credentials). If the given access device is then determined to be within range of a predicted trajectory of the user and the user normally accesses or operates that device at the present day/time or has a preference to operate that device over another that is in the vicinity of the user, the given access device is instructed to be operated (e.g., the door lock is opened). In this way, when the user reaches the given access device, the given access device is ready to be operated without the user having to bring an access card in close proximity to the given access device.

In some embodiments, the disclosed embodiments provide systems and methods to perform long range access control based on trajectory and intent prediction. According to the disclosed embodiments, an observed trajectory of a user and user behavior information for the user are received. The disclosed embodiments process the observed trajectory by a machine learning technique to generate a plurality of predicted trajectories. The machine learning technique can be trained to establish a relationship between a plurality of training observed trajectories and training predicted trajectories. The disclosed embodiments adjust the plurality of predicted trajectories based on the user behavior information to determine user intent to operate a target access control device. The disclosed embodiments, in response to determining that the target access control device is within a threshold range of the given one of the plurality of predicted trajectories, perform an operation associated with the target access control device.

FIG. 1 is a block diagram showing an example system 100 according to various exemplary embodiments. The system 100 can be an access control system that includes a client device 120, one or more access control devices 110 that control access to a protected asset or resource, such as through a lockable door, and an authorization management system 140 that are communicatively coupled over a network 130 (e.g., Internet, BLE, ultra-wideband (UWB) communication protocol, telephony network).

Ultra-wide band (UWB) is a radio frequency (RF) technique that uses short, low power, pulses over a wide frequency spectrum. The pulses are on the order of millions of individual pulses per second. The width of the frequency spectrum is generally greater than 500 megahertz or greater than twenty percent of an arithmetic center frequency.

UWB can be used for communication, such as by encoding data via time modulation (e.g., pulse-position encoding). Here, symbols are specified by pulses on a subset of time units out of a set of available time units. Other examples of UWB encodings can include amplitude modulation and/or polarity modulation. The wide band transmission tends to be more robust to multipath fading than carrier-based transmission techniques. Further, the lower power of pulses at any given frequency tend to reduce interference with carrier-based communication techniques.

UWB can be used in radar operations, providing localization accuracies on the scale of tens of centimeters. Due to the possibly variable absorption and reflection of different frequencies in a pulse, both surface and obstructed (e.g., covered) features of an object can be detected. In some cases, the localization provides an angle of incidence in addition to distance.

The client device 120 and the access control devices 110 can be communicatively coupled via electronic messages (e.g., packets exchanged over the Internet, BLE, UWB, WiFi direct or any other protocol). While FIG. 1 illustrates a single access control device 110 and a single client device 120, it is understood that a plurality of access control devices 110 and a plurality of client devices 120 can be included in the system 100 in other embodiments. As used herein, the term "client device" may refer to any machine that interfaces to a communications network (such as network 130) to exchange credentials with an access control device 110, the authorization management system 140, another client device 120 or any other component to obtain access to the asset or resource protected by the access control device 110. The client device 120 can use UWB to obtain location information and compute a current trajectory of the client device 120.

In one embodiment, the client device 120 can provide the current trajectory information to the authorization management system 140. In some embodiments, the access control device 110 can determine the current trajectory of the client device 120 and provide such information to the authorization management system 140. The client device 120 (alone or in combination with the access control device 110) collects various user behavior information from a user of the client device 120. Such user behavior information can include any one or more of physical movement of the user, stride of the user, times and locations at which the user operates different types of access control devices 110, and other client devices or types of access control devices within range of the user when a given access control device is operated by the user. The various user behavior information can be stored and/or collected by the authorization management system 140. In some embodiments, the client device 120 (alone or in combination with the access control device 110) collects this information by monitoring physical movement of the client device 120 and/or a stride of the user. In some implementations, at least some of the user behavior information is collected by the client device 120 (alone or in combination with the access control device 110) and/or the authorization management system 140. The authorization management system 140 allows the user to opt in or opt out of collection of some or all of the user behavior information to maintain user privacy.

In some cases, some or all of the components and functionality of the authorization management system 140 can be included in the client device 120 (e.g., any of the machine learning techniques discussed in relation to the authorization management system 140 can be implemented on respective client devices 120). Any component that performs trajectory and intent prediction in the system 100 can be implemented as a standalone component of any one of the authorization management system 140, client device 120 or the access control device 110. The functions of any component that performs trajectory and intent prediction in the system 100 can be implemented in a distributed manner across any one of the authorization management system 140, client device 120 and/or the access control device 110.

The authorization management system 140 predicts one or more trajectories using a machine learning technique based on the current trajectory. The authorization management system 140 also receives or obtains user behavior information and adjusts the predicted one or more trajectories based on the user behavior information (e.g., the authorization management system 140 concatenates the predicted trajectories with the user behavior information). In some implementations, the authorization management system 140 uses a machine learning technique to compute a feature vector based on the user behavior information associated with the user. In some implementations, the authorization management system 140 applies a machine learning model to the input current trajectory and the input user behavior information to generate the prediction of the one or more trajectories. Each trajectory can be associated with a particular or given probability that the user will take a path that follows that trajectory. The authorization management system 140 identifies the predicted trajectory with the highest probability. The authorization management system 140 then determines whether a given access control device 110 is within a specified range of the identified predicted trajectory. If so, the authorization management system 140 instructs the given access control device 110 to grant access or perform an operation and if not, the authorization management system 140 instructs the given access control device 110 (to which the user has been authorized to access) to deny access or prevent performing the operation.

A client device 120 may be, but is not limited to, a mobile phone, desktop computer, laptop, portable digital assistants (PDAs), smart phones, a wearable device (e.g., a smart watch), tablets, ultrabooks, netbooks, laptops, multi-processor systems, microprocessor-based or programmable consumer electronics, or any other communication device that a user may use to access a network.

The access control device 110 can include an access reader device connected to a physical resource (e.g., a door locking mechanism or backend server) that controls the physical resource (e.g., door locking mechanism). The physical resource associated with the access control device 110 can include a door lock, an ignition system for a vehicle, or any other device that grants or denies access to a physical component and that can be operated to grant or deny access to the physical component. For example, in the case of a door lock, the access control device 110 can deny access, in which case the door lock remains locked and the door cannot be opened, or can grant access, in which case the door lock becomes unlocked to allow the door to be opened. As another example, in the case of an ignition system, the access control device 110 can deny access, in which case the vehicle ignition system remains disabled and the vehicle cannot be started, or can grant access, in which case the vehicle ignition becomes enabled to allow the vehicle to be started.

Access control covers a range of systems and methods to govern access, for example by people, to secure areas or secure assets. access control includes identification of authorized users or devices (e.g., vehicles, drones, etc.) and actuation of a gate, door, or other facility used to secure an area or actuation of a control mechanism, e.g., a physical or electronic/software control mechanism, permitting access to a secure asset. The access control device 110 forms part of access control systems (PACS) which can include a reader (e.g., an online or offline reader) that holds authorization data and can be capable of determining whether credentials (e.g., from credential or key devices such as radio frequency identification (RFID) chips in cards, fobs, or personal electronic devices such as mobile phones) are authorized for an actuator or control mechanism (e.g., door lock, door opener, software control mechanism, turning off an alarm, etc.), or PACS can include a host server to which readers and actuators are connected (e.g., via a controller) in a centrally managed configuration. In centrally managed configurations, readers can obtain credentials from credential or key devices and pass those credentials to the PACS host server. The host server then determines whether the credentials authorize access to the secure area or secure asset and commands the actuator or other control mechanism accordingly. While examples in physical access control are used herein, the disclosure applies equally to logical access control system (LACS) use cases (e.g., logical access to personal electronic devices, rider identification in transport services, access and asset control in unmanned store, etc.).

Wireless PACS, e.g., those that utilize wireless communication between the reader and the credential or key device, can use RFID or personal area network (PAN) technologies, such as the IEEE 802.15.1, Bluetooth, Bluetooth Low Energy (BLE), near field communications (NFC), ZigBee, GSM, CDMA, Wi-Fi, etc. Many of these technologies have a few drawbacks for a seamless user experience. For example, the range of NFC is so short that credential exchange typically does not happen until the user is very near the secure area or asset and attempts to gain access. The credential transfer to the reader and response by the reader or host server can take several seconds, resulting in a frustrating user experience. Further, the user generally must remove the device from a pocket, for example, and place it on or very near the reader for the process to begin.

On the other hand, BLE devices have a range of tens of meters (e.g., ten to twenty meters). Thus, credential exchange can be accomplished as the user approaches the reader. BLE, as well as many other PAN standards, however, do not offer accurate physical tracking of devices (e.g., ranging, positioning, etc.). Thus, it can be difficult for the reader to determine whether the user actually intends to gain access to the secure area or asset without some additional evidence of intent. It is problematic, for example, if an authorized user merely passed by the reader in a hall and the door was unlocked, or even opened. Evidence of intent can include such things as touching a door handle, gesturing with the key-device, etc. This, however, can be a less than ideal user experience when compared with a user simply walking up to the reader and gaining access to the secured area without further action or interaction on the part of the user.

To help address one or more of these or other issues, localization techniques (e.g., using secure UWB ranging) can be used and can be combined with PAN discovery and key exchange. Localization techniques of UWB can be more accurate than some conventional techniques and can, for example, be accurate to the tens of centimeters. UWB localization techniques may provide both range and direction of the credential or key device with respect to the reader.

This accuracy far surpasses the roughly ten-meter accuracy of, for example, BLE when readers are not coordinated. The precision of UWB accuracy can be a useful tool in seamlessly determining user intent (e.g., whether the user is attempting to access the secure area or asset, or is simply passing by) and a current or predicted trajectory of the user. For example, several zones can be defined, such as near the reader, at the reader, etc., to provide different contexts for understanding user intent. Additionally, or alternatively, the accuracy of the tracking helps to provide an accurate model of user motion or the direction of movement of the user from which intent can be discerned. Thus, the reader can categorize user motion as, for example, likely approaching the reader or simply walking past.

Once the intent trigger occurs, the reader may act on the credentials exchanged, for example, via a PAN technology. For an offline reader, e.g., a reader not connected to a control panel or host server, the reader may directly control the actuator or other control mechanism (e.g., a lock on a disconnected door). In a centrally managed PACS, an (online) reader may forward the credentials to a control panel or host server to act upon.

In general, the access control device 110 can include one or more of a memory, a processor, one or more antennas, a communication module, a network interface device, a user interface, and a power source or supply.

The memory of the access control device 110 can be used in connection with the execution of application programming or instructions by the processor of the access control device 110, and for the temporary or long-term storage of program instructions or instruction sets and/or credential or authorization data, such as credential data, credential authorization data, or access control data or instructions. For example, the memory can contain executable instructions that are used by the processor to run other components of access control device 110 and/or to make access determinations based on credential or authorization data. The memory of the access control device 110 can comprise a computer readable medium that can be any medium that can contain, store, communicate, or transport data, program code, or instructions for use by or in connection with access control device 110. The computer readable medium can be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), Dynamic RAM (DRAM), any solid-state storage device, in general, a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

The processor of the access control device 110 can correspond to one or more computer processing devices or resources. For instance, the processor can be provided as silicon, as a Field Programmable Gate Array (FPGA), an Application-Specific Integrated Circuit (ASIC), any other type of Integrated Circuit (IC) chip, a collection of IC chips, or the like. As a more specific example, processor can be provided as a microprocessor, Central Processing Unit (CPU), or plurality of microprocessors or CPUs that are configured to execute instructions sets stored in an internal memory and/or memory of the access control device 110. The access control devices also encapsulate sensory devices that may or may not have antenna.

The antenna of the access control device 110 can correspond to one or multiple antennas and can be configured to provide for wireless communications between access control device 110 and a credential or key device (e.g., client device 120). The antenna can be arranged to operate using one or more wireless communication protocols and operating frequencies including, but not limited to, the IEEE 802.15.1, Bluetooth, Bluetooth Low Energy (BLE), near field communications (NFC), ZigBee, GSM, CDMA, Wi-Fi, RF, UWB, and the like. By way of example, the antenna(s) can be RF antenna(s), and as such, may transmit/receive RF signals through free space to be received/transferred by a credential or key device having an RF transceiver. In some cases, at least one antenna is an antenna designed or configured for transmitting and/or receiving UWB signals (referred to herein for simplicity as a "UWB antenna") such that the reader can communicate using UWB techniques with the client device 120.

A communication module of the access control device 110 can be configured to communicate according to any suitable communications protocol with one or more different systems or devices either remote or local to access control device 110, such as one or more client devices 120 and/or authorization management system 140.

The network interface device of the access control device 110 includes hardware to facilitate communications with other devices, such as a one or more client devices 120 and/or authorization management system 140, over a communication network, such as network 130, utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, wireless data networks (e.g., IEEE 802.11 family of standards known as Wi-Fi, IEEE 802.16 family of standards known as WiMAX), IEEE 802.15.4 family of standards, and peer-to-peer (P2P) networks, among others. In some examples, network interface device can include an Ethernet port or other physical jack, a Wi-Fi card, a Network Interface Card (NIC), a cellular interface (e.g., antenna, filters, and associated circuitry), or the like. In some examples, network interface device can include a plurality of antennas to wirelessly communicate using at least one of single-input multiple-output (SIMO), multiple-input multiple-output (MIMO), or multiple-input single-output (MISO) techniques.

A user interface of the access control device 110 can include one or more input devices and/or display devices. Examples of suitable user input devices that can be included in the user interface include, without limitation, one or more buttons, a keyboard, a mouse, a touch-sensitive surface, a stylus, a camera, a microphone, etc. Examples of suitable user output devices that can be included in the user interface include, without limitation, one or more LEDs, an LCD panel, a display screen, a touchscreen, one or more lights, a speaker, etc. It should be appreciated that the user interface can also include a combined user input and user output device, such as a touch-sensitive display or the like.

The network 130 may include, or operate in conjunction with, an ad hoc network, an intranet, an extranet, a virtual private network (VPN), a local area network (LAN), a wireless network, a wireless LAN (WLAN), a wide area network (WAN), a wireless WAN (WWAN), a metropolitan area network (MAN), BLE, UWB, the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other short range or long range protocols, or other data transfer technology.

In an example, as the client device 120 approaches the access control device 110 (e.g., comes within range of a BLE communication protocol), the client device 120 transmits over the network 130 credentials of the client device 120. In some cases, the credentials can be selected from a plurality of credentials based on a current geographical location of the client device 120. For example, multiple credentials each associated with a different geographical location can be stored on the client device 120. When the client device 120 comes within a certain distance of a geographical location associated with one of the credentials (e.g., within 10 meters), the client device 120 retrieves the associated credentials from local memory.

In one example, the client device 120 provides the credentials directly to the access control device 110. In such cases, the access control device 110 communicates with the authorization management system 140 the credentials. The authorization management system 140 in FIG. 1 includes the authorization system 142 and the trajectory and intent prediction system 144. The authorization management system 140 can further include elements described with respect to FIGS. 6 and 7, such as a processor and memory, having instructions stored thereon, that when executed by the processor, causes the processor to control the functions of the authorization management system 140.

The authorization management system 140 searches a list of credentials stored in the authorization system 142 to determine whether the received credentials match credentials from the list of authorized credentials for accessing a secure asset or resource (e.g., door or secure area) protected by the access control device 110. In response to determining that the received credentials are authorized to access the access control device 110, the authorization management system 140 accesses the trajectory and intent prediction system 144 to determine whether the trajectory of the client device 120 is predicted to be within a specified range (e.g., 2 meters) of the access control device 110 and whether user behavior information indicates an intent of the user to follow a given trajectory and/or operate a given access control device 110, as discussed in more detail below. Once the trajectory and intent prediction system 144 indicates to the authorization management system 140 that the client device 120 is predicted to follow a trajectory that is within the specified range of the access control device 110 and that the user behavior information indicates user intent to access or operate the device 110, the authorization management system 140 instructs the access control device 110 to perform an operation granting access for the client device 120 (e.g., instructing the access control device 110 to unlock a lock of a door).

In another example, the client device 120 provides the credentials to the authorization management system 140. The authorization management system 140 searches a list of credentials stored in the authorization system 142 to determine whether the received credentials match credentials from the list of authorized credentials for accessing a secure asset or resource (e.g., door or secure area) protected by the access control device 110. In response to determining that the received credentials are authorized to access the access control device 110, the authorization management system 140 accesses the trajectory and intent prediction system 144 to determine whether the trajectory of the client device 120 is predicted to be within a specified range (e.g., 2 meters) of the access control device 110 and whether user behavior information indicates an intent of the user to follow a given trajectory and/or operate a given access control device 110, as discussed in more detail below. Once the trajectory and intent prediction system 144 indicates to the authorization management system 140 that the client device 120 is predicted to follow a trajectory that is within the specified range of the access control device 110 and that the user behavior information indicates an intent of the user to follow a given trajectory and/or operate a given access control device 110, the authorization management system 140 instructs the access control device 110 (associated with the received credentials and that is within a geographical distance of the client device 120) to perform an operation granting access to the client device 120 (e.g., instructing the access control device 110 to unlock a lock of a door).

In one example, the trajectory and intent prediction system 144 is implemented locally on the access control device 110. In such cases, the access control device 110 locally determines based on hard coded range or threshold distance information whether to grant/deny access for the client device 120. In another example, the trajectory and intent prediction system 144 is implemented on the client device 120 and provides the trajectory and intent prediction to the access control device 110. The access control device 110 then determines whether the client device 120 is within a range associated with the access control device 110 to grant/deny access for the client device 120.

The trajectory and intent prediction system 144 trains one or more machine learning techniques implemented by the authorization management system 140 to predict one or more trajectories for a client device 120 based on an observed trajectory and a set of user behavior information.

In one embodiment, the trajectory and intent prediction system 144 implements a first machine learning technique that receives a feature vector representing a current trajectory of the user and conditions prediction of one or more predicted trajectories on the set of user behavior information. The predicted trajectories are input to an intent prediction machine learning technique that indicates a prediction as to whether the user intends to operate an access control device that is within range of the predicted trajectories.

In another embodiment, the trajectory and intent prediction system 144 implements a first machine learning technique that receives a feature vector representing a current trajectory of the user and predicts one or more trajectories based on the current trajectory. The predicted one or more trajectories are concatenated or otherwise combined with a feature vector representing user behavior information. In some cases, the feature vector representing the user behavior information is determined or provided by another machine learning technique. The predicted trajectories concatenated with the feature vector representing the user behavior information are input to an intent prediction machine learning technique that indicates a prediction as to whether the user intends to operate an access control device that is within range of the predicted trajectories.

In another embodiment, the trajectory and intent prediction system 144 implements a first machine learning technique that receives a feature vector representing a current trajectory of the user and a feature vector representing user behavior information and predicts one or more trajectories based on the current trajectory and the feature vector representing user behavior information. In some cases, the predicted one or more trajectories are also concatenated or otherwise combined with the feature vector representing user behavior information. In some cases, the feature vector representing the user behavior information is determined or provided by another machine learning technique. The predicted trajectories concatenated with the feature vector representing the user behavior information are input to an intent prediction machine learning technique that indicates a prediction as to whether the user intends to operate an access control device that is within range of the predicted trajectories.

The trajectory and intent prediction system 144 processes pairs of training observed current trajectories and/or user behavior information and corresponding ground-truth trajectories and user behavior information to train a machine learning technique. The ground-truth trajectories represent subsequent trajectories that are followed after one or more observed trajectories. For example, the ground-truth trajectory represents a second segment of a trajectory that follows a first segment of a trajectory. The ground truth user behavior information represents a feature vector that includes a collection of features present and/or missing from an input data set of user behavior information.

The disclosed machine learning techniques can be implemented by any combination of a neural network, such as Long-Short Term Memory Neural Networks (LSTM), an autoencoder, a variational auto-encoder, a conditioned variational auto-encoder, a convolutional neural network, a radial basis network, a deep feed-forward network, a recurrent neural network, a gated recurrent unit, a denoising autoencoder, a sparse autoencoder, a Markov chain, a Hopfield network, a Boltzmann machine, a deep belief network, a deep convolutional network, a deconvolutional neural network, a generative adversarial network, a liquid state machine, an extreme learning machine, an echo state network, a deep residual network, a support vector machine, a Korhonen network, or any combination thereof.

The trajectory and intent prediction system 144 obtains a specified range of activation or operation of the access control device 110. For example, the trajectory and intent prediction system 144 obtains a unique identifier of the access control device 110 and searches the access control devices range(s) 430 stored in database 400 (FIG. 4) to identify and retrieve the range associated with the unique identifier of the access control device 110. Different access control devices 110 or types of access control devices 110 can be associated with different ranges of activation or operation and each is stored with its respective unique identifier in the access control device range(s) 430. In some cases, the access control device range(s) 430 stores device types with respective ranges. In such circumstances, the device type is used to retrieve the associated range from the access control device range(s) 430 rather than the unique identifier. The trajectory and intent prediction system 144 determines whether the predicted trajectory falls within the specified range of the access control device 110 and whether the intent prediction indicates a user intent to operate the access control device 110. If so, the trajectory and intent prediction system 144 instructs the authorization management system 140 to activate or operate the access control device 110 to grant access to the client device 120.

In another example, the trajectory and intent prediction system 144 is implemented locally on the access control device 110. In such cases, the access control device 110 is hard programmed with a corresponding range of activation (e.g., the range stored in the access control devices range(s) 430 for the access control device 110). The trajectory and intent prediction system 144 implemented on the access control device 110 determines whether the predicted trajectory falls within the hard-coded range. If so, the trajectory and intent prediction system 144 causes the access control device 110 to grant access for the client device 120. In another example, the trajectory and intent prediction system 144 is implemented on the client device 120 and provides the trajectory and intent prediction to the access control device 110. The access control device 110 then determines whether the client device 120 is within a range associated with the access control device 110 to grant/deny access for the client device 120.

In some cases, the trajectory and intent prediction system 144 does not access any range information, but simply provides the predicted trajectory or set of trajectories to the authorization management system 140, client device 120, and/or access control device 110. These devices collectively or individually then make a decision as to whether the predicted trajectory is within the threshold range.

Figure 2:
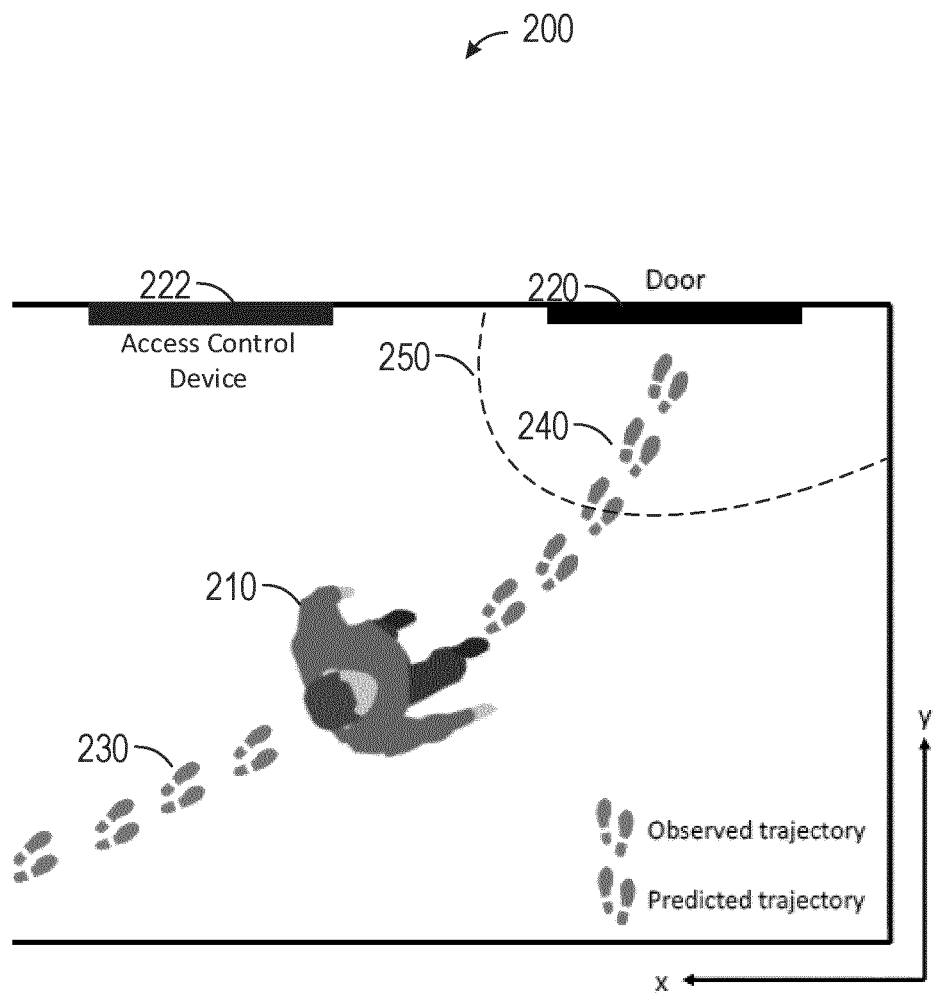
FIG. 2 illustrates an example access control system based on trajectory prediction, according to exemplary embodiments.

FIG. 2 illustrates an example access control system 200 based on trajectory and intent prediction, according to exemplary embodiments. For example, a user 210 may be carrying a client device 120 (not shown), such as a mobile device or phone. The client device 120 (or access control device 110) may collect a set of observed 2D and/or 3D coordinates 230. The client device 120 (or access control device 110) may compute a current trajectory for the user. The client device 120 (alone or in combination with the access control device 110) also collects a set of user behavior information for the user, such as a stride of the user and/or physical movement of the user. The client device 120 (alone or in combination with the access control device 110) may also collect times and locations at which the client device 120 is used to operate various access control devices 110. Using this information, a trained machine learning technique can determine or derive intent or preferences for the user with respect to operating certain access control devices 110. In some cases, the access control device 110 stores identifiers of client devices 120 that operate the access control device 110 and the times at which various client devices 120 operate the access control device 110. This user behavior information is then aggregated into respective profiles of the client devices 120 to generate the user behavior information associated with the respective client devices 120.

In one example, the client device 120 may determine that two access control devices 220 and 222 are within a specified range of the client device 120. For example, each of the access control devices 220 and 222 are within a range of BLE communication with the client device 120. In response, the client device 120 retrieves credentials of both of the access control devices 220 and 222 and transmits those credentials to the authorization management system 140. The authorization management system 140 determines that the client device 120 is authorized to access both of the access control devices 220 and 222. In response, the authorization management system 140 delays granting access to a particular one of the access control devices 220 or 222 until the client device 120 is determined to be traveling along a predicted trajectory that is within a particular range 250 of the respective access control devices 220 or 222.

In another example, there may be a single access control device 110 that secures access to an area protected by the single access control device 110. In such cases, the intent of the user to enter the secure area is determined prior to instructing the access control device 110 to grant access for the given client device 120. Specifically, a determination is made as to whether the predicted trajectory of the user falls within range of the access control device 110 prior to instructing the access control device 110 to grant access to the client device 120.

For example, the client device 120 (or access control device 110) provides the observed current trajectory to the trajectory and intent prediction system 144. The client device 120 (alone or in combination with the access control device 110) also provides user behavior information for a user associated with the client device 120. In another example, the access control device 110 provides the observed current trajectory to the trajectory and intent prediction system 144. The access control device 110 can independently or in combination with the client device 120 provide user behavior information for a user associated with the client device 120.

The trajectory and intent prediction system 144 predicts one or more trajectories based on the current trajectory and the user behavior information. The trajectory and intent prediction system 144 then identifies a predicted trajectory 240 along which the client device 120 is predicted to travel. In response to determining that the predicted trajectory 240 falls within range of a first access control device 220, the trajectory and intent prediction system 144 instructs the authorization management system 140 to cause the first access control device 220 to grant access to the client device 120 (e.g., the first access control device 220 is instructed to perform an operation, such as unlocking an electronic door lock). In response to determining that the predicted trajectory 240 fails to fall within range of a second access control device 222, the trajectory and intent prediction system 144 instructs the authorization management system 140 to cause the second access control device 222 to deny access to the client device 120 (e.g., the second access control device 222 is instructed to remain locked even though the credentials of the client device 120 are authorized to access the second access control device 222). In some cases, the predicted trajectory falls within range of both the first and second access control devices 220 and 222. However, the trajectory and intent prediction system 144 predicts a user intent (e.g., based on the user behavior information) to operate the first access control device 220. In such cases, the trajectory and intent prediction system 144 instructs the authorization management system 140 to cause the first access control device 220 to grant access to the client device 120 (e.g., the first access control device 220 is instructed to perform an operation, such as unlocking an electronic door lock) and causes the second access control device 222 to deny access to the client device 120.

Figure 3A:
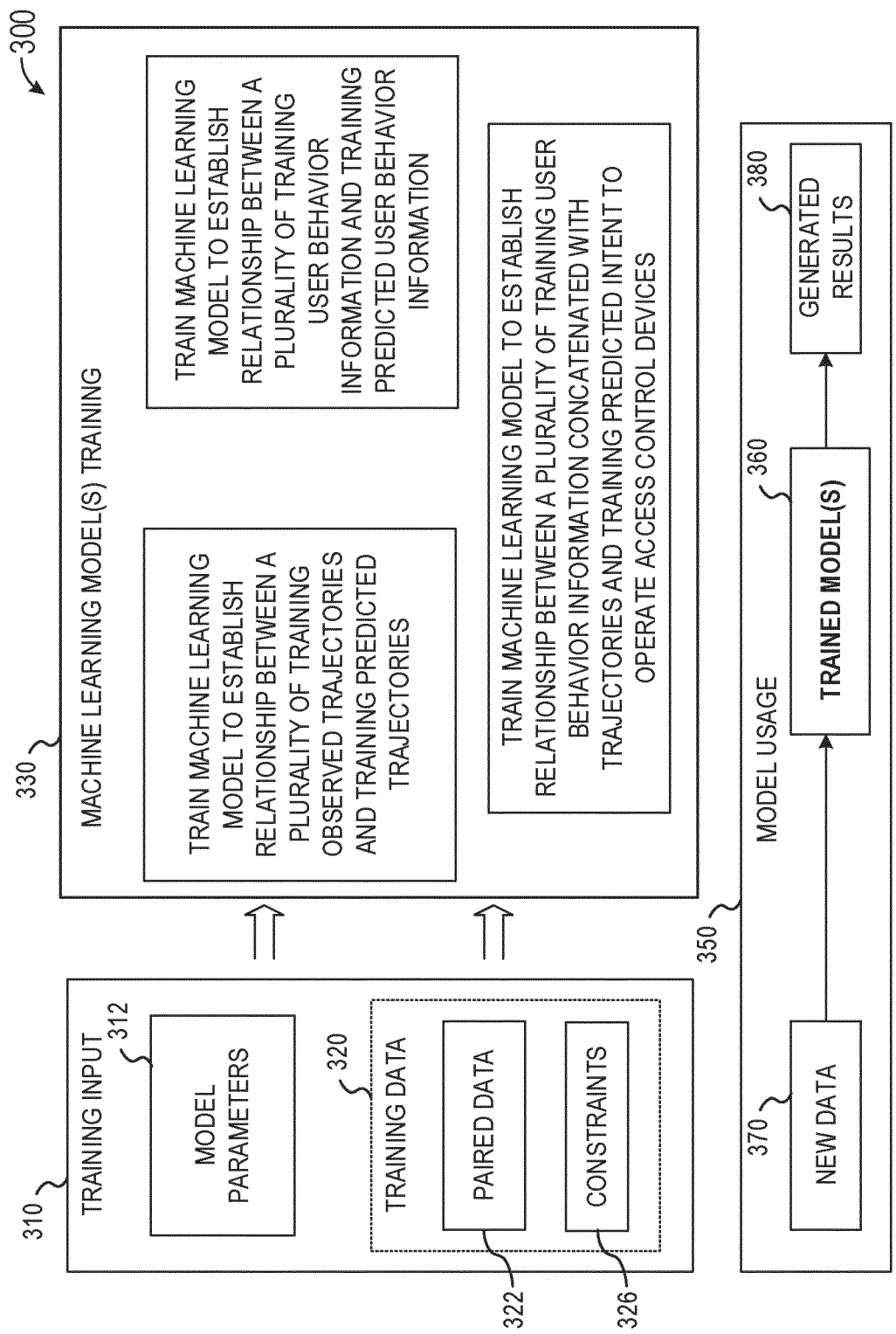
FIGS. 3A-3C are block diagrams of an example trajectory and intent prediction system that may be deployed within the access control system of FIG. 1, according to some embodiments.
Figure 3B:
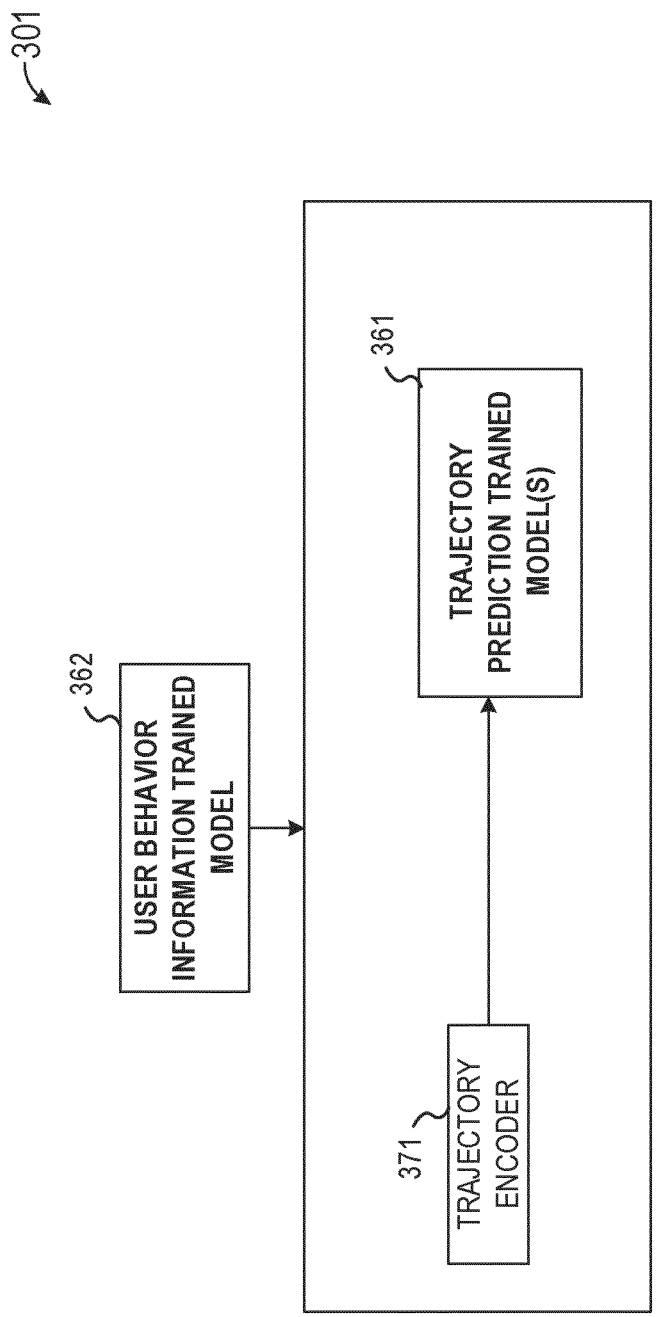
Figure 3C:
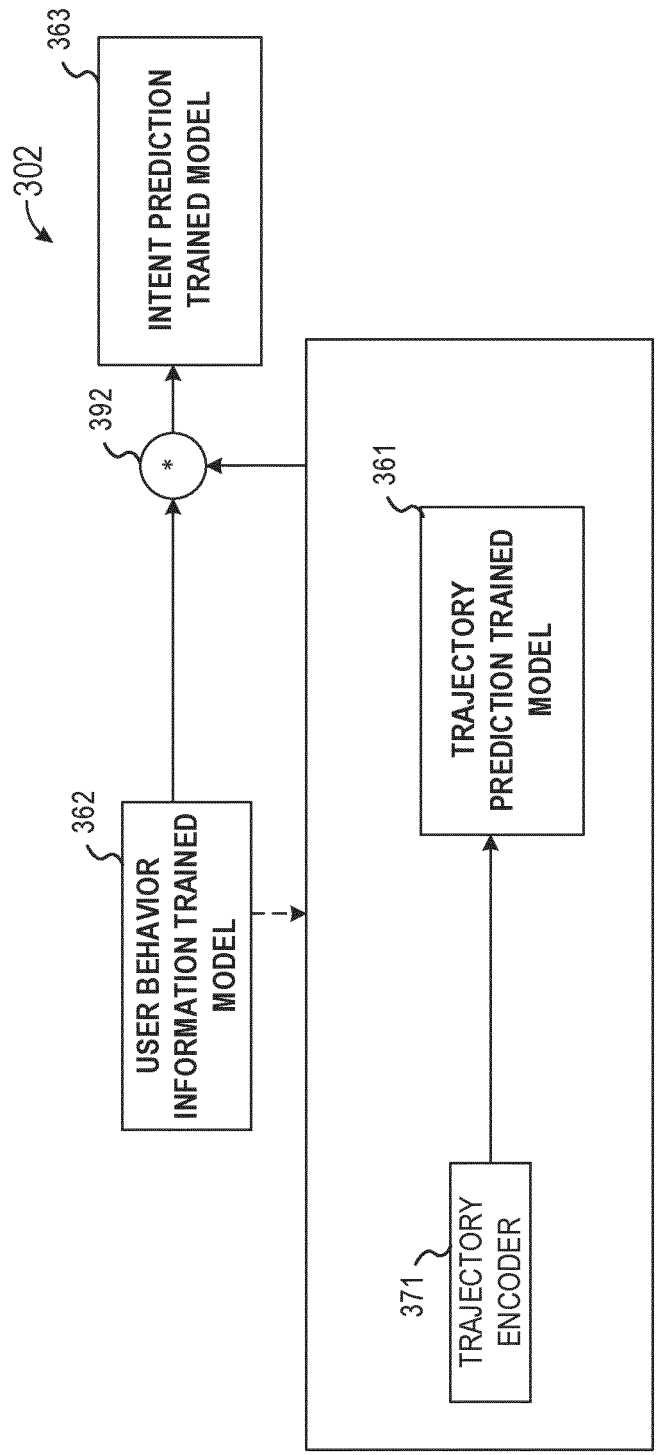

FIG. 3A-C are block diagrams of an example trajectory and intent prediction system 144 that may be deployed within the system of FIG. 1, according to some embodiments. Training input 310 includes model parameters 312 and training data 320 which may include paired training data sets 322 (e.g., input-output training pairs) and constraints 326. Model parameters 312 stores or provides the parameters or coefficients of corresponding ones of machine learning models. During training, these parameters 312 are adapted based on the input-output training pairs of the training data 320. After the parameters 312 are adapted (after training), the parameters are used by trained models 360 to implement the trained machine learning (ML) models on a new set of data 370.

Training data 320 includes constraints 326 which may define the constraints of a given trajectory and user behavior information. The paired training data 320 may include sets of input-output pairs 322, such as pairs of a plurality of training observed trajectories and training user behavior information and corresponding training predicted trajectories (ground truth trajectories). The ground truth predicted trajectories represent the actual trajectories at one or more future points in time that follow an observed trajectory and set of user behavior information at earlier points in time. For example, an observed trajectory and user behavior measurement can be obtained at a first time point for a first segment of a path. A ground truth predicted trajectory represents the actual observed trajectory at a second time point for a second segment that follows the first segment.

Some components of training input 310 may be stored separately at a different off-site facility or facilities than other components of training input 310. The paired training data 320 may include pairs of a plurality of training user behavior information and corresponding training feature vectors of user behavior information (ground truth user behavior information). The paired training data 320 may include pairs of a plurality of training predicted trajectories concatenated with user behavior information and corresponding training intent to operate access control devices (ground truth intents). The ground truth intents are generated by collecting information indicating whether a given access device 110 was operated or not when a trajectory concatenated with certain user behavior information was observed.

Machine learning model(s) training 330 trains one or more machine learning techniques based on the sets of input-output pairs of paired training data 322. For example, the model training 330 may train a first set of ML model parameters 312 by minimizing a loss function based on one or more ground-truth measurements. Particularly, the first set of ML model parameters 312 can be applied to a training set of observed current trajectories conditioned on a set of user behavior information to estimate predicted trajectories. In some implementations, a derivative of a loss function is computed based on a comparison of the estimated predicted trajectories and the ground truth trajectories and the first set of ML model parameters are updated based on the computed derivative of the loss function. The first set of ML model parameters can be applied to a first machine learning technique (e.g., a conditioned variational autoencoder) to generate a first prediction given new data 370.

As another example, the model training 330 may train a second set of ML model parameters 312 by minimizing a loss function based on one or more ground-truth measurements. Particularly, the second set of ML model parameters 312 can be applied to a training set of observed user behavior information to estimate a feature vector that represents the user behavior information. In some implementations, a derivative of a loss function is computed based on a comparison of the estimated user behavior information and the ground truth user behavior information and the second set of ML model parameters are updated based on the computed derivative of the loss function. The second set of ML model parameters can be applied to a second machine learning technique (e.g., a neural network) to generate a second prediction given new data 370.

As another example, the model training 330 may train a third set of ML model parameters 312 by minimizing a loss function based on one or more ground-truth measurements. Particularly, the second set of ML model parameters 312 can be applied to a training set of user behavior information concatenated with predicted trajectories to estimate predicted intent to operate an access control device. In some implementations, a derivative of a loss function is computed based on a comparison of the estimated predicted intent to operate an access control device and the ground truth intent to operate an access control device and the third set of ML model parameters are updated based on the computed derivative of the loss function. The third set of ML model parameters can be applied to a third machine learning technique (e.g., a neural network) to generate a third prediction given new data 370.

The first, second and/or third ML models can be all stored on the same device (e.g., on the client device 120, on the access control device 110, or centrally on the authorization management system 140). In some cases, one of the first, second and/or third ML models can be implemented by one device (e.g., on the client device 120, on the access control device 110, or centrally on the authorization management system 140) while another one of the first, second and third ML models is implemented by a different device (e.g., on the client device 120, on the access control device 110, or centrally on the authorization management system 140).

The result of minimizing the loss function for multiple sets of training data trains, adapts, or optimizes the model parameters 312 of the corresponding ML models. In this way, the ML models are trained to establish a relationship between a plurality of training data (e.g., observed trajectory, observed user behavior information, concatenated trajectories and user behavior information) and a corresponding plurality of predicted training data (e.g., predicted trajectories, predicted user behavior information, predicted intent to operate an access control device).

Figure 4:
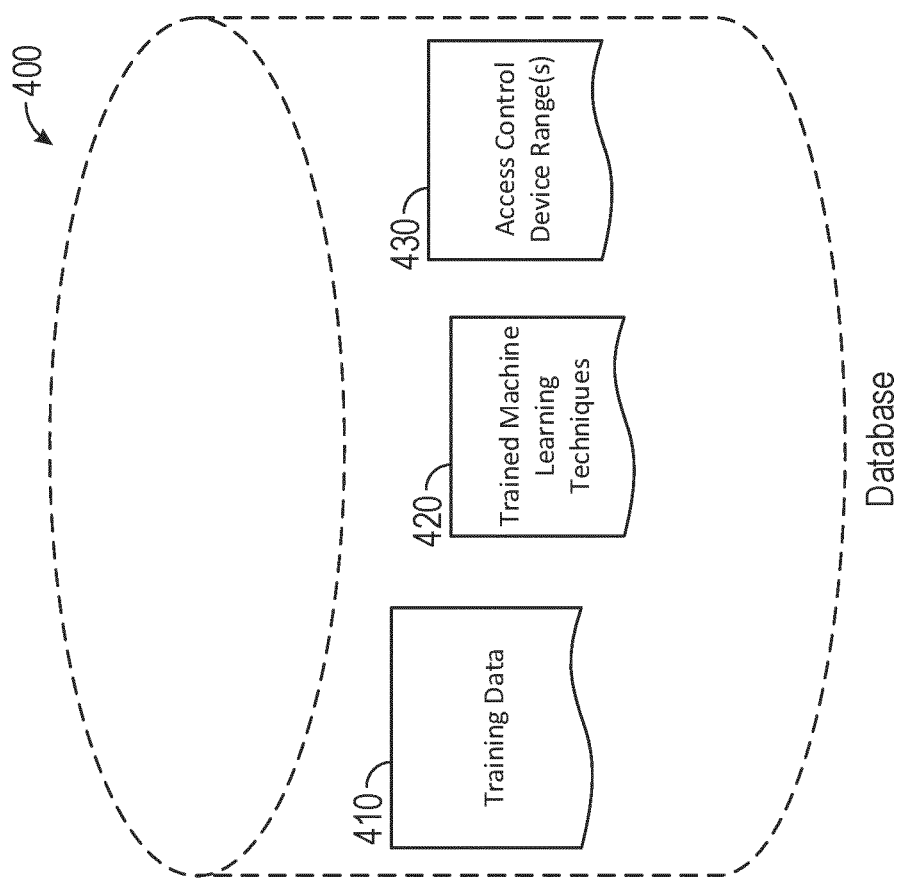
FIG. 4 is an example database that may be deployed within the system of FIGS. 1, 2, and 3A-C, according to some embodiments.

The ML models are trained in one implementation according to supervised learning techniques to estimate a trajectory from a training observed trajectory and user behavior information. In such cases, to train the ML model, a plurality of training observed trajectory and user behavior information are retrieved together with their corresponding training predicted or estimated trajectories. For example, the training observed trajectory and user behavior information are retrieved from training data 410 stored in database 400 (FIG. 4). The ML model is applied to a first batch of training observed trajectory and user behavior information to estimate a given set of trajectories. The batch of the training observed trajectory and user behavior information can be used to train the ML model with the same parameters and may range from one training observed trajectory and user behavior information to all of the training observed trajectory and user behavior information. In some implementations, the output or result of the ML model is used to compute or predict a first set of predicted trajectories.

The first set of predicted trajectories is applied to a loss function and a gradient or derivative of the loss function is computed based on an expected or ground truth set of predicted trajectories. Based on the gradient or derivative of the loss function, updated parameters for the ML model are computed. For example, parameters of the ML model are stored in trained machine learning technique 420 of database 400. The ML model is then applied with the updated parameters to a second batch of training observed trajectory and user behavior information to again estimate a given set of predicted trajectories and apply the predicted trajectories to a loss function for comparison with their corresponding ground truth predicted trajectories. Parameters of the ML model are again updated, and iterations of this training process continue for a specified number of iterations or epochs or until a given convergence criteria has been met.

After the machine learning model is trained, new data 370, including one or more observed trajectory and user behavior information, may be received. The trained machine learning technique may be applied to the new data 370 to generate generated results 380 including predicted trajectories with their corresponding likelihoods that a user will follow a path along each respective trajectory.

FIG. 3B shows one implementation 301 of the trajectory and intent prediction system 144 that may be deployed within the system of FIG. 1. An observed trajectory may be received from a client device 120. The observed trajectory is processed by a trajectory encoder 371 to generate a feature vector corresponding to the current trajectory. The feature vector corresponding to the current trajectory is input to the trajectory prediction trained model 361. The trajectory prediction trained model 361 may operate using a first set of model parameters 312 and may implement a conditioned variational autoencoder. Any other type of neural network or machine learning technique may be similarly used as the trajectory prediction trained model 361. The trajectory prediction trained model 361 also receives user behavior information from the user behavior information trained model 362. The user behavior information trained model 362 is configured to receive a set of user behavior information (e.g., encoded as a vector) and generate a feature vector that represents the user behavior information. In one example, the trajectory prediction trained model 361 and the user behavior information trained model 362 are trained end-to-end.

The trajectory prediction trained model 361 processes the feature vector corresponding to the current trajectory and the feature vector that represents the user behavior information and predicts one or more trajectories. The predicted trajectories may be processed by another machine learning technique (not shown) to determine a user intent to operate an access control device within range of one or more of the one or more trajectories. After authorizing the user credentials to access the access control device that is within the range of the client device 120, in response to determining that the user intent to operate an access control device within range of one or more of the one or more trajectories, the trajectory and intent prediction system 144 instructs the access control device that is within the range of the client device 120 to grant access or perform an operation (e.g., unlock a door lock).

FIG. 3C shows another implementation 302 of the trajectory and intent prediction system 144 that may be deployed within the system of FIG. 1. An observed trajectory may be received from a client device 120. The observed trajectory is processed by a trajectory encoder 371 to generate a feature vector corresponding to the current trajectory. The feature vector corresponding to the current trajectory is input to the trajectory prediction trained model 361. The trajectory prediction trained model 361 may operate using a first set of model parameters 312 and may implement a variational autoencoder. Any other type of neural network or machine learning technique may be similarly used as the trajectory prediction trained model 361. The trajectory prediction trained model 361 processes the feature vector corresponding to the current trajectory and predicts one or more trajectories. These predicted one or more trajectories are provided to a concatenator 392. In some cases, the trajectory prediction trained model 361 processes the feature vector corresponding to the current trajectory and feature vector that represents the user behavior information and predicts one or more trajectories. These one or more trajectories (predicted based on the current trajectory and the feature vector that represents the user behavior information) are provided to a concatenator 392.

The user behavior information trained model 362 is configured to receive a set of user behavior information (e.g., encoded as a vector) and generate a feature vector that represents the user behavior information. The feature vector that represents the user behavior information is also provided to the concatenator 392. In some embodiments, the user behavior information trained model 362 can output a result or feature vector that indicates a very low confidence score for the generated result (e.g., the user behavior information fails to satisfy a minimum parameter of user behavior information). This can be the case if an insufficient amount (e.g., less than a threshold quantity of specified types, such as times at which access devices of different types and locations are operated, a stride of the user, physical movement of the user, whether the user carries the client device 120 or keeps the device in their pocket, who the user is with when an access control device is operated, and so forth) of user behavior information has been collected for a given user. In such circumstances, the predictions as to the user intent and trajectories can be assigned a very low probability and prevents access to an access control device that is within range of the client device 120 even though credentials of the client device 120 are authorized for accessing the access control device.

As an example, if a user recently added a new key to an electronic door lock, there may be a period of training that needs to be performed to generate the feature vector representing user behavior with a high level of confidence. Once the feature vector representing user behavior with a high level of confidence is achieved, the intent prediction can be provided with a high level of probability and the access control device that is within range of the client device 120 is instructed to be operated (e.g., unlocked) when the credentials of the client device 120 are authorized for accessing the access control device. Namely, there may exist a period of training associated with each new set of credentials or keys that are added by the user to the client device 120 for accessing a corresponding access control device. During this period, access control device may only be accessed and operated by the client device 120 using a short-range communication protocol (e.g., NFC), such as within 20 centimeters. After training of the user behavior information trained model 362 for the newly added credentials is completed, the access control device may be accessed and operated by the client device 120 using a long-range communication protocol (e.g., BLE), such as within 10 meters.

In one example, the concatenator 392 combines (e.g., adjusts) the one or more trajectories (predicted only based on the current trajectory) based on the feature vector that represents the user behavior information. In another example, the concatenator 392 combines (e.g., adjusts) the one or more trajectories (predicted based on a current trajectory and based on the feature vector representing user behavior information) based on the feature vector that represents the user behavior information. The concatenated result of the concatenator 392 is provided to an intent prediction trained model 363. Concatenator 392 can be implemented as any device that combines, multiplies, aggregates, sums and/or otherwise generates a single representation from multiple input data sets.

The intent prediction trained model 363 determines a user intent to operate an access control device within range of one or more of the one or more trajectories. The intent prediction trained model 363 may also be a neural network that is trained end-to-end. The intent prediction trained model 363 is trained to output a prediction as to whether a user intends to operate a given access control device within range of the client device 120 (e.g., based on a predicted set of trajectories as adjusted by a feature vector that represents the user behavior information. The intent prediction trained model 363 can output an intent (e.g., yes or no) as to whether the user will operate or intends to operate a given access control device along with a probability indicating a likelihood that the user will operate the access control device. After authorizing the user credentials to access the access control device that is within the range of the client device 120, in response to determining that the user intent to operate an access control device within range of one or more of the one or more trajectories with a specified probability greater than a threshold probability, the trajectory and intent prediction system 144 instructs the access control device that is within the range of the client device 120 to grant access or perform an operation (e.g., unlock a door lock).

In one example, the intent prediction trained model 363 is trained to predict a user intent to operate an access control device at a certain time of the day and when the user is within range of one or more other client devices 120. Namely, the user behavior information trained model 362 may provide times (e.g., 9 AM and 5 PM) at which the particular access control device is operated by the user and a set of identifiers of other client devices 120 within a certain range (e.g., 5 meters) of the client device 120 when the access control device is operated. The intent prediction trained model 363 may identify the access control device within the range of a predicted trajectory of the user and determine that the current time is within a specified threshold of the times of 9 AM or 5 PM. In such cases, in relation to a social network information contained in the user behavior information, the intent prediction trained model 363 also determines if other client devices with matching identifiers to the set of identifiers are within a specified range of the client device 120. If so, the intent prediction trained model 363 determines that the intent for the user to operate the access control device is very high (e.g., 90%) and causes that access device to grant access to the user. The intent prediction trained model 363 may also determine that another access control device that is within the range of the predicted trajectories has a very low intent (e.g., less than 10%) for the user to operate (e.g., because the user did not in the past operate that device at the particular time and when within range of the set of identifiers of the other client devices 120)

and causes that access device to deny access to the user even though the user has credentials for accessing or operating the access device.

In some embodiments, user behavior data is collected over time after one or more of the trained models are implemented in a system that includes the client devices 120. In this case, the user behavior model (e.g., the user behavior information trained model 362) and trajectory model (e.g., trajectory prediction trained model 361) are decoupled. This may be because the user behavior model is not available due to the lack of training data. In this case, only the trajectory model is used to perform the trajectory prediction to cause an access device to grant or deny access to the user. In such circumstances, the user behavior model includes a classifier that receives as input the user behavior information (e.g., the stride, time of day, preference, social network information, target door(s)) and outputs a probability of the user's intention to access a given access device. This probability is then combined with the trajectory probability to generate a prediction of the user's intent to operate a given access device.

In some embodiments, the user behavior model receives as input multiple doors or access control devices instead of a single door or access control device. In this case, the user behavior model outputs a probability of the user's intent to operate each of the multiple access control devices. Namely, a probability is output for each access control device that indicates the probability of the user to operate the given access control device. This probability is combined with the trajectory probability to determine a user's intent to access a given one of the multiple access control devices or none at all. In some embodiments, the combination of the trajectory with the probability output by the user behavior model is generated as a weighted average of the predictions made by the two models—the user behavior information trained model 362 and the trajectory prediction trained model 361. The weights may be configurable by the system administrator and/or may automatically evolve dynamically over time as the models become more accurate given more user behavior data being collected.

Figure 5:
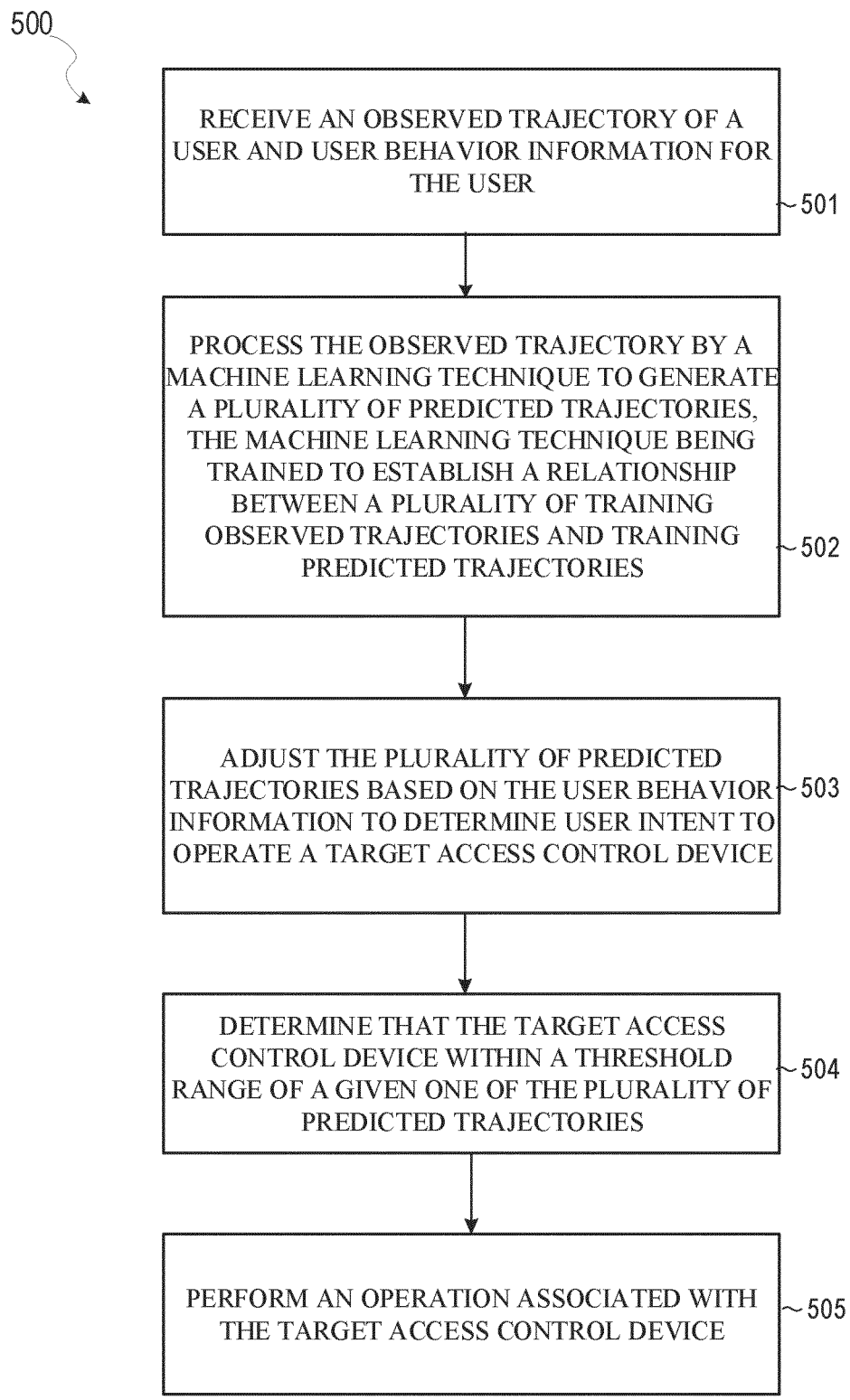
FIG. 5 is a flowchart illustrating example operations of the access control system, according to example embodiments.

FIG. 5 is a flowchart illustrating example operations of process 500 of the access control system 100, according to example embodiments. The process 500 may be embodied in computer-readable instructions for execution by one or more processors such that the operations of the process 500 may be performed in part or in whole by the functional components of the system 100; accordingly, the process 500 is described below by way of example with reference thereto. However, in other embodiments, at least some of the operations of the process 500 may be deployed on various other hardware configurations. Some or all of the operations of process 500 can be in parallel, out of order, or entirely omitted.

At operation 501, the authorization management system 140 receives an observed trajectory of a user and user behavior information for the user. For example, the authorization management system 140 receives a current trajectory for the client device 120 and a set of user behavior information (e.g., physical movement of the user, stride of the user, preferences for accessing certain access devices at certain times of day, a social network of the user, such as who the user is around at different times of day or days of the week, preferences for the user to open certain doors in a particular sequence, and so forth).

At operation 502, the authorization management system 140 processes the observed trajectory by a machine learning technique to generate a plurality of predicted trajectories, the machine learning technique being trained to establish a relationship between a plurality of training observed trajectories and training predicted trajectories. For example, the trajectory prediction trained model 361 processes the current trajectory to generate a prediction of one or more trajectories.

At operation 503, the authorization management system 140 adjusts the plurality of predicted trajectories based on the user behavior information to determine user intent to operate a target access control device. For example, the trajectory prediction trained model 361 processes the current trajectory conditioned on the user behavior information to adjust the prediction of the one or more trajectories.

At operation 504, the authorization management system 140 determines that the target access control device within a threshold range of a given one of the plurality of predicted trajectories. For example, the authorization management system 140 determines that a location of a first access control device 220 has a range 250 that is within the predicted one or more trajectories.

At operation 505, the authorization management system 140 in response to determining that the target access control device is within the threshold range of the given one of the plurality of predicted trajectories, performs an operation associated with the target access control device. For example, the authorization management system 140 instructs the access control device 220 to grant access to the client device 120 (e.g., by unlocking an electronic door lock). In some cases, the authorization management system 140 controls the lock or secure resource directly bypassing the access control device 110.

Figure 6:
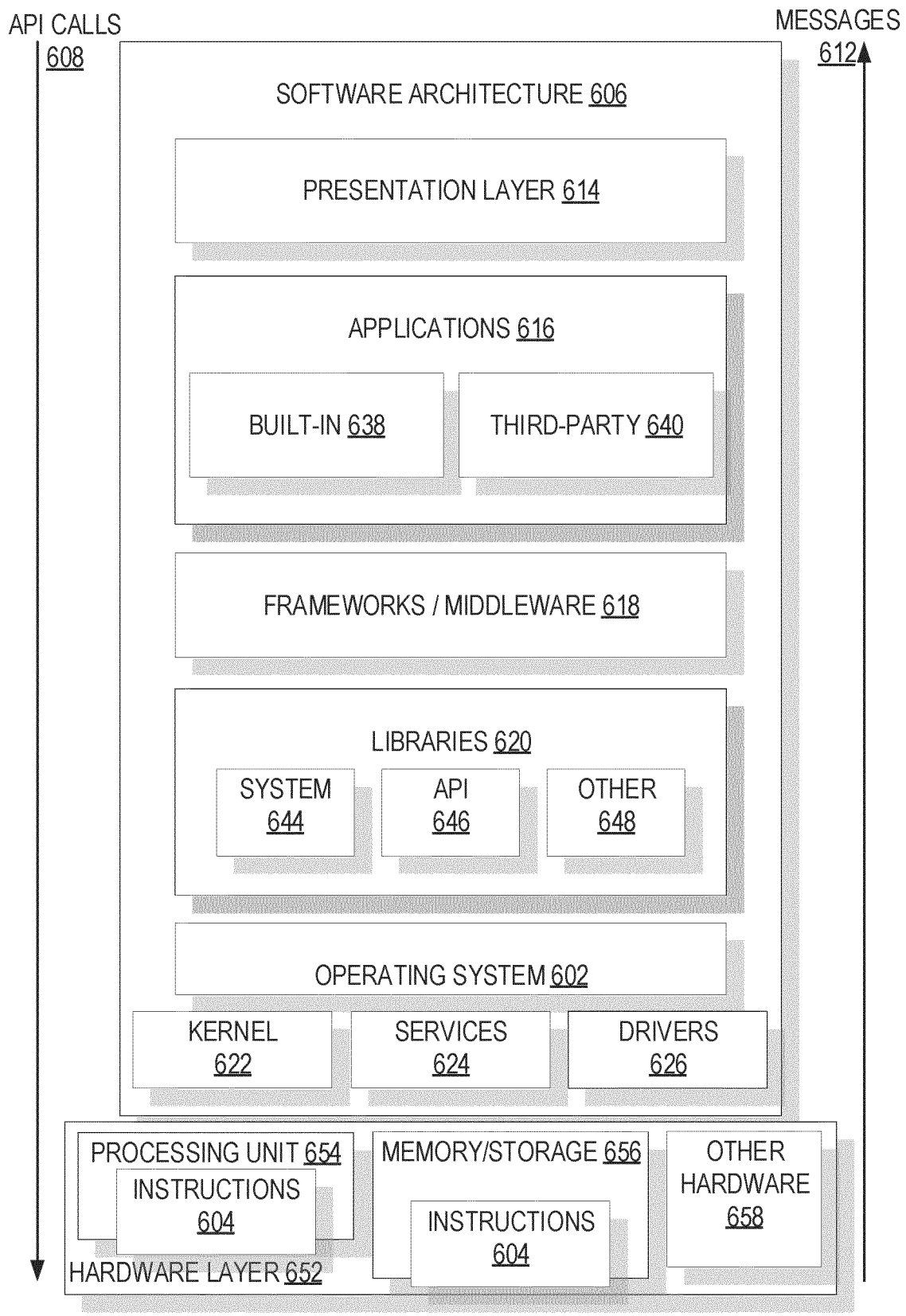
FIG. 6 is a block diagram illustrating an example software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as machine 700 of FIG. 7 that includes, among other things, processors 704, memory 714, and input/output (I/O) components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components, and so forth described herein. The hardware layer 652 also includes memory and/or storage devices memory/storage 656, which also have executable instructions 604. The hardware layer 652 may also comprise other hardware 658. The software architecture 606 may be deployed in any one or more of the components shown in FIG. 1.

In the example architecture of FIG. 6, the software architecture 606 may be conceptualized as a stack of layers where each layer provides particular functionality. For example, the software architecture 606 may include layers such as an operating system 602, libraries 620, frameworks/middleware 618, applications 616, and a presentation layer 614. Operationally, the applications 616 and/or other components within the layers may invoke API calls 608 through the software stack and receive messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, BLE drivers, UWB drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624 and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/devices.

The frameworks/middleware 618 (also sometimes referred to as middleware) provide a higher-level common infrastructure that may be used by the applications 616 and/or other software components/devices. For example, the frameworks/middleware 618 may provide various graphic user interface functions, high-level resource management, high-level location services, and so forth. The frameworks/middleware 618 may provide a broad spectrum of other APIs that may be utilized by the applications 616 and/or other software components/devices, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built-in operating system functions (e.g., kernel 622, services 624, and/or drivers 626), libraries 620, and frameworks/middleware 618 to create UIs to interact with users of the system. Alternatively, or additionally, in some systems, interactions with a user may occur through a presentation layer, such as presentation layer 614. In these systems, the application/component "logic" can be separated from the aspects of the application/component that interact with a user.

Figure 7:
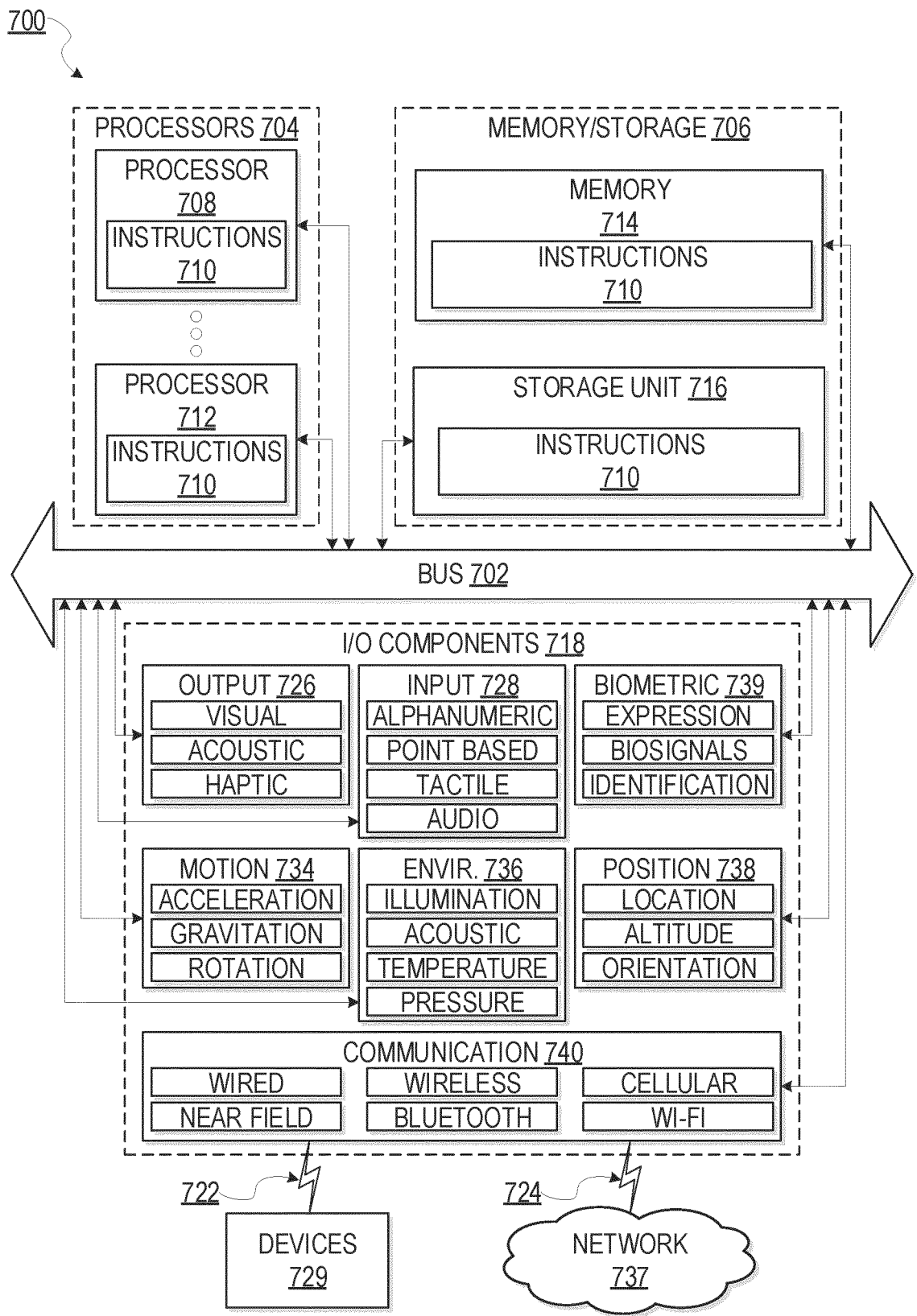
FIG. 7 is a block diagram illustrating components of a machine, according to some example embodiments.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement devices or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a STB, a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory/storage 706, and I/O components 718, which may be configured to communicate with each other such as via a bus 702. In an example embodiment, the processors 704 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 708 and a processor 712 that may execute the instructions 710. The term "processor" is intended to include multi-core processors 704 that may comprise two or more independent processors (sometimes referred to as "cores") that may execute instructions contemporaneously. Although FIG. 7 shows multiple processors 704, the machine 700 may include a single processor with a single core, a single processor with multiple cores (e.g., a multi-core processor), multiple processors with a single core, multiple processors with multiple cores, or any combination thereof.

The memory/storage 706 may include a memory 714, such as a main memory, or other memory storage, instructions 710, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 739, motion components 734, environmental components 736, or position components 738 among a wide array of other components. For example, the biometric components 739 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environmental components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 737 or devices 729 via coupling 724 and coupling 722, respectively. For example, the communication components 740 may include a network interface component or other suitable device to interface with the network 737. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 729 may be another machine or any of a wide variety of peripheral devices (e.g., a peripheral device coupled via a USB).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra-book, netbook, laptop, multi-processor system, microprocessor-based or programmable consumer electronics, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a LAN, a BLE network, a UWB network, a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC, or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment.

Thus, the following claims are hereby incorporated into the Detailed Description, with each claim standing on its own as a separate embodiment.

What is claimed is:

1. A method comprising:
   receiving, by one or more processors, an observed trajectory of a user and user behavior information for the user;
   processing the observed trajectory by a machine learning technique to generate a plurality of predicted trajectories, the machine learning technique being trained to establish a relationship between a plurality of training observed trajectories and training predicted trajectories, a first predicted trajectory of the plurality of predicted trajectories representing a first future path the user will follow from the observed trajectory and a second predicted trajectory of the plurality of predicted trajectories representing a second future path the user will follow from the observed trajectory;
   adjusting the plurality of predicted trajectories based on the user behavior information to determine user intent to operate a target access control device;
   determining that the target access control device is within a threshold range of a given one of the plurality of predicted trajectories; and
   in response to determining that the target access control device is within the threshold range of the given one of the plurality of predicted trajectories, performing an operation associated with the target access control device.

2. The method of claim 1, wherein the target access control device comprises a lock associated with a door, and wherein the performing the operation comprises unlocking the door.

3. The method of claim 2, further comprising:
   establishing a wireless communication link between a mobile device of a user and the target access control device;
   exchanging authorization information over the wireless communication link; and
   performing the operation after determining that the user is authorized, based on the authorization information, to access the target access control device.

4. The method of claim 3, further comprising:
   determining that the user is authorized, based on the authorization information, to access the target access control device prior to performing the operation; and
   delaying performing the operation after determining that the user is authorized until the target access control device is determined to be within the threshold range of the given one of the plurality of predicted trajectories.

5. The method of claim 3, further comprising:
   determining that the user is authorized, based on the authorization information, to access the target access control device prior to performing the operation; and
   preventing performing the operation after determining that the user is authorized in response to determining that the target access control device is outside of the threshold range of the given one of the plurality of predicted trajectories.

6. The method of claim 1, wherein the machine learning technique comprises a conditioned variational autoencoder.

7. The method of claim 6, wherein adjusting the plurality of predicted trajectories based on the user behavior information comprises processing the observed trajectory and the user behavior information by the conditioned variational autoencoder to generate the plurality of predicted trajectories, wherein each of the plurality of predicted trajectories is associated with a respective probability indicating a likelihood that the user will travel along the corresponding predicted trajectory.

8. The method of claim 1, wherein the machine learning technique comprises a variational autoencoder.

9. The method of claim 8, wherein adjusting the plurality of predicted trajectories based on the user behavior information comprise concatenating the user behavior information with the plurality of predicted trajectories output by the variational autoencoder, wherein each of the plurality of predicted trajectories is associated with a respective probability indicating a likelihood that the user will travel along the corresponding predicted trajectory.

10. The method of claim 8, further comprising processing the concatenated user behavior information and the plurality of predicted trajectories with a second machine learning technique, the second machine learning technique being trained to establish a relationship between a plurality of training user behavior information and predicted intentions of operating access control devices.

11. The method of claim 1, further comprising encoding the observed trajectory of the user, wherein the machine learning technique is applied to the encoded observed trajectory of the user.

12. The method of claim 1, further comprising:
determining whether the received user behavior information satisfies a minimum parameter of user behavior information.

13. The method of claim 12, further comprising:
in response to determining that the received user behavior information satisfies the minimum parameter of user behavior information, allowing the target access control device to perform the operation.

14. The method of claim 12 further comprising:
in response to determining that the received user behavior information fails to satisfy the minimum parameter of user behavior information, preventing the target access control device from performing the operation.

15. The method of claim 12, wherein the minimum parameter comprises a threshold quantity of specified types of user behavior information.

16. The method of claim 1, further comprising generating the user behavior information by encoding a feature vector that includes at least one of:
monitoring physical movement of the user;
monitoring a stride of the user;
identifying times and locations at which the user operates different types of access control devices;
identifying other client devices and other types of access control devices within range of the user when a given access control device is being operated by the user; or
identifying other users who are typically in his/her social network.

17. The method of claim 1, wherein the machine learning technique comprises a first machine learning technique, further comprising:
generating the user behavior information by a second machine learning technique, the second machine learning technique being trained to establish a relationship between training user behavior information and predicted user behavior information; and
generating the user intent to operate the target access control device by a third machine learning technique, the third machine learning technique being trained to establish a relationship between training user behavior information concatenated with a set of trajectories and predicted user intent to operate access control devices.

18. A system comprising:
one or more processors coupled to a memory comprising non-transitory computer instructions that when executed by the one or more processors perform operations comprising:
receiving an observed trajectory of a user and user behavior information for the user;
processing the observed trajectory by a machine learning technique to generate a plurality of predicted trajectories, the machine learning technique being trained to establish a relationship between a plurality of training observed trajectories and training predicted trajectories, a first predicted trajectory of the plurality of predicted trajectories representing a first future path the user will follow from the observed trajectory and a second predicted trajectory of the plurality of predicted trajectories representing a second future path the user will follow from the observed trajectory;
adjusting the plurality of predicted trajectories based on the user behavior information to determine user intent to operate a target access control device;
determining that the target access control device is within a threshold range of a given one of the plurality of predicted trajectories; and
in response to determining that the target access control device is within the threshold range of the given one of the plurality of predicted trajectories, performing an operation associated with the target access control device.

19. A non-transitory computer readable medium comprising non-transitory computer-readable instructions for performing operations comprising:
receiving an observed trajectory of a user and user behavior information for the user;
processing the observed trajectory by a machine learning technique to generate a plurality of predicted trajectories, the machine learning technique being trained to establish a relationship between a plurality of training observed trajectories and training predicted trajectories, a first predicted trajectory of the plurality of predicted trajectories representing a first future path the user will follow from the observed trajectory and a second predicted trajectory of the plurality of predicted trajectories representing a second future path the user will follow from the observed trajectory;
adjusting the plurality of predicted trajectories based on the user behavior information to determine user intent to operate a target access control device;
determining that the target access control device is within a threshold range of a given one of the plurality of predicted trajectories; and
in response to determining that the target access control device is within the threshold range of the given one of the plurality of predicted trajectories, performing an operation associated with the target access control device.

20. The non-transitory computer readable medium of claim 19, wherein training the machine learning technique comprises:
receiving pairs of training data comprising observed trajectories and corresponding ground-truth trajectories, wherein the ground-truth trajectories represent subsequent trajectories that follow the observed trajectories;

applying model parameters of the machine learning technique to a first batch of the training data to generate estimated predicted trajectories;
computing a derivative of a loss function based on comparing the estimated predicted trajectories to the ground-truth trajectories;
updating the model parameters of the machine learning technique based on the computed derivative of the loss function; and
iteratively applying the updated model parameters to additional batches of training data until meeting a specified convergence criteria.

\* \* \* \* \*